(No Model.)

H. C. CROWELL.
SHAFT BUSHING FOR LOOSE PULLEYS.

No. 372,521. Patented Nov. 1, 1887.

Witnesses.
Inventor.
Hilen C. Crowell
Per. Sturgeon
Att'y

United States Patent Office.

HILEN C. CROWELL, OF ERIE, PENNSYLVANIA.

SHAFT-BUSHING FOR LOOSE PULLEYS.

SPECIFICATION forming part of Letters Patent No. 372,521, dated November 1, 1887.

Application filed December 22, 1886. Serial No. 222,331. (No model.)

*To all whom it may concern:*

Be it known that I, HILEN C. CROWELL, a citizen of the United States, residing at the city of Erie, in the county of Erie and State of Pennsylvania, have invented certain new and useful Improvements in Shaft-Bushings for Loose Pulleys; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in shaft-bushings for loose pulleys, hereinafter set forth and explained, and is illustrated in the accompanying drawings, in which—

Figure 1:
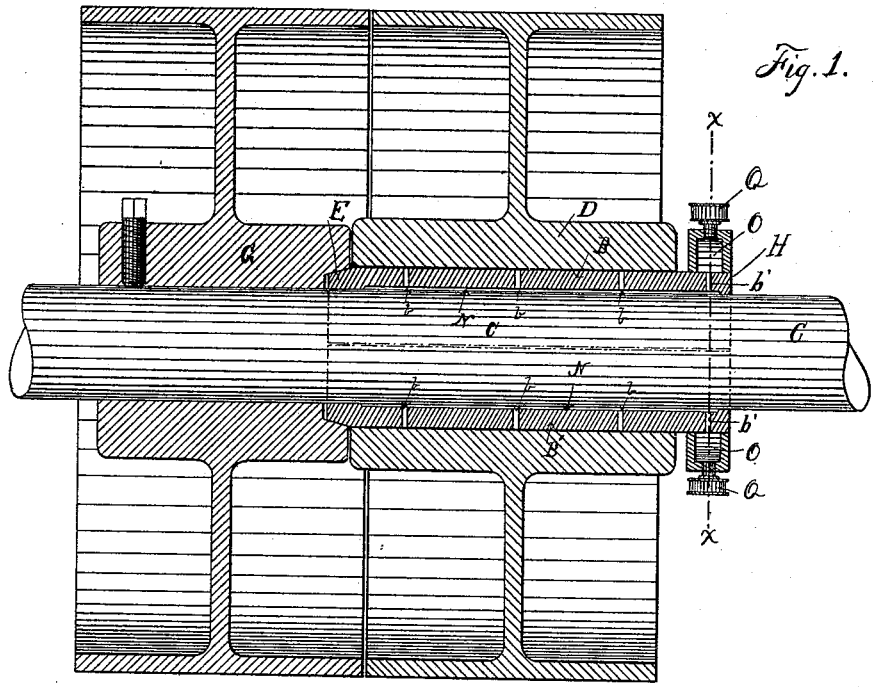
Figures 2, 3, 4:
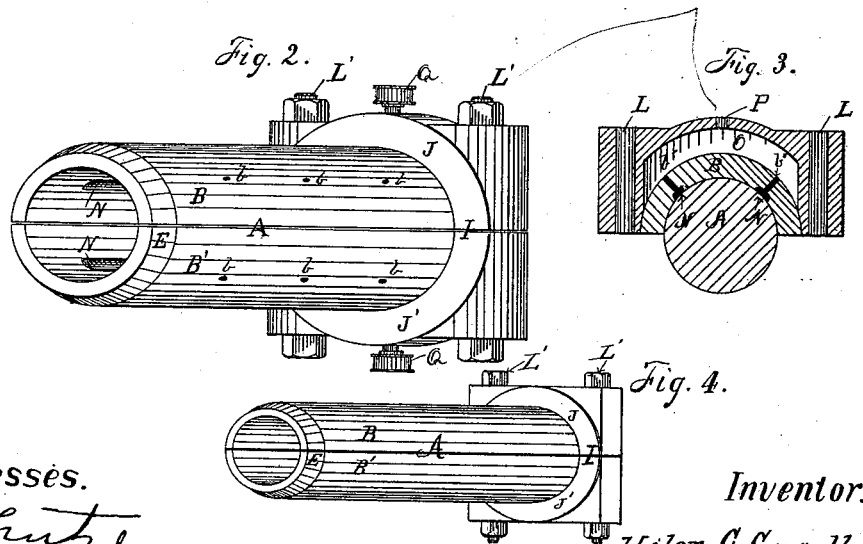

Figure 1 shows a vertical longitudinal section of a tight and loose pulley mounted on a shaft provided with my improved shaft-bushing. Fig. 2 is a perspective view of my improved shaft-bushing and clamp therefor detached from the shaft. Fig. 3 is a cross-section, on the line $x\ x$ in Fig. 1, of one of the sections of the bushing, and also of one of the sections of the clamping-collar. Fig. 4 shows a modified form of my improved shaft-bushing.

Like letters refer to like parts in all the figures.

The principal objects of my invention are to provide a shaft-bushing for loose pulleys of such construction that it can readily be removed and replaced with a new one when worn without either taking down the pulley or the shaft upon which it runs, and which will also effectually protect the shaft from being worn by the pulley; also, in making the bushing and clamping-collar therefor in such shape that they operate as a self-oiling device for the pulley.

Other features of the invention will appear hereinafter in the specification and claims.

To accomplish these objects I cast, preferably of Babbitt metal or other anti-friction metal, a sectional sleeve, A. This sleeve is preferably cast of but two parts, B B', though it may be made of a greater number of parts, if desired. The inside diameter of these sections B B', I make of suitable size to about fit the shaft to which they are to be applied, and of such outside diameter as to fit the hub of the pulley to be run thereon.

The sections B B' of the sleeve A, I cast of sufficient length so that the ends thereof will project some little distance beyond the ends of the pulley-hub; and one end thereof is beveled at E, on the outside, so that it will enter a tapering recess in the end of the hub of the fixed pulley, as illustrated in Fig. 1. A collar secured to the shaft C, provided on one side thereof with a tapering radial recess adapted to receive and retain the beveled end of the sleeve A, can be used in place of the fixed pulley-hub, if desired, the other end of the sleeve A projecting a sufficient distance beyond the outer end of the loose pulley-hub to receive a clamping-collar. This clamping-collar I, I preferably construct in two sections, J J', and provide it with bolt-holes L L, through which clamping-bolts L' L' pass, by means whereof it is clamped over the end of the sleeve A, thus securing it to the shaft, so that the loose pulley runs on the outside surface of the sleeve A only.

I have hereinbefore described the sleeve A as being beveled at one end, so as to enter a recess in an adjacent pulley hub or collar. I can, however, if desired, use another clamping-collar thereon; but I prefer the method of securing it first described.

In Figs. 1, 2, and 3 I show means whereby a lubricant can be continuously supplied to the wearing-surface of the sleeve A. To accomplish this result, I cast in the inside of each of the sections B B' of the sleeve A grooves N, which do not reach to the ends of the sections B B', and from these grooves N, I leave small openings $b$ through the sleeve-sections B B', which communicate with the inner surface of the loose pulley-hub, and also openings $b'$, which communicate with oil-chambers O in the sections J J' of the clamping-collar I. These chambers O, I make by coring out the central part of each of the sections J J', as illustrated in Figs. 1 and 3. In the outer shells of these chambers O, I make openings P for filling them with oil, which I preferably close with screw-plugs Q.

In operation the oil or other lubricant is put into the chambers O O in the collar I, whence it passes through the openings $b'$ in the sleeve A, along the grooves N, between the sleeve and the shaft, and out through the openings $b$ to the inner surface of the loose pulley-hub running thereon, keeping it constantly lubricated until the supply of lubricant in the chambers O O is exhausted.

In Fig. 4 I show a form of my improved shaft-bushing without the oiling devices hereinbefore described, this form being used by me in some cases where the shaft constantly runs and the loose pulley stands still a good portion of the time, in which case it is more convenient to oil it through openings in the hub of the pulley.

A feature of my invention is that by means of my improved sleeve I can fit any pulley-hub which is larger than the shaft upon which it is desired to run it by varying the thickness of the sections B B' of the sleeve A to suit; and in this manner, also, when a loose pulley-hub becomes worn, a heavier sleeve can be inserted to compensate for the wear without taking down the shaft or removing the loose pulley. I do this by removing the clamping-collar I, and while the pulley rests on the upper half of the bushing remove the lower half and insert the new, and then turn the shaft half around and remove the other half and replace it with the new. I then replace the clamping-collar, and the pulley is again ready for use.

Further description of the operation of my invention is unnecessary, as the same is obvious to those skilled in the art to which it appertains.

Having thus fully described my invention, so as to enable others to construct and operate the same, what I claim as new, and desire to secure by Letters Patent of the United States, is—

1. The combination, in a shaft bushing for loose pulleys, of a sectional sleeve with a detachable sectional collar having clamping-bolts therein adapted to embrace and clamp the said sleeve to a shaft, substantially as and for the purpose set forth.

2. The combination, in a shaft-bushing for loose pulleys, of a sectional sleeve having its inner end beveled off on the outside thereof with a fixed pulley-hub having an annular recess in the end thereof adapted to receive and retain the inner end of said sleeve in close contact with the shaft and a detachable sectional clamping-collar adapted to encircle and clamp the outer end of said sleeve to the shaft, substantially as and for the purpose set forth.

3. The combination, in a shaft-bushing clamp, of the sections J J', provided with the chambers O therein, with the clamping-bolts L' L', substantially as and for the purpose set forth.

4. The combination, in a shaft-bushing for loose pulleys, of a sleeve constructed of longitudinal sections provided with longitudinal grooves on their inner surfaces and openings from said grooves to their outer surfaces, with a clamping-collar having oil-chambers in the sections thereof, substantially as and for the purpose set forth.

5. The combination, in a shaft-bushing for loose pulleys, of the sleeve-sections B B', having the outside of one end thereof beveled at E and provided with the longitudinal grooves N and the openings $b$ and $b'$, with the clamping-collar I, constructed of the sections J J', having the oil-chambers O therein, the screw-plugs Q, and the clamping-bolts L' L', substantially as and for the purpose set forth.

In testimony whereof I affix my signature in presence of two witnesses.

HILEN C. CROWELL.

Witnesses:
H. J. CURTZE,
H. M. STURGEON.